US012645622B2

(12) United States Patent
Han et al.

(10) Patent No.: US 12,645,622 B2
(45) Date of Patent: Jun. 2, 2026

(54) METHOD AND APPARATUS FOR CREATING SHAREABLE REMOTE DIRECT MEMORY ACCESS LINK

(71) Applicant: CLOUD INTELLIGENCE ASSETS HOLDING (SINGAPORE) PRIVATE LIMITED, Singapore (SG)

(72) Inventors: Yunqi Han, Beijing (CN); Liang You, Beijing (CN); Xin Long, Hangzhou (CN)

(73) Assignee: CLOUD INTELLIGENCE ASSETS HOLDING (SINGAPORE) PRIVATE LIMITED, Singapore (SG)

( * ) Notice: Subject to any disclaimer, the term of this patent is extended or adjusted under 35 U.S.C. 154(b) by 0 days.

(21) Appl. No.: 18/842,350

(22) PCT Filed: Feb. 9, 2023

(86) PCT No.: PCT/CN2023/075204
§ 371 (c)(1),
(2) Date: Aug. 28, 2024

(87) PCT Pub. No.: WO2023/165309
PCT Pub. Date: Sep. 7, 2023

(65) Prior Publication Data
US 2025/0165417 A1    May 22, 2025

(30) Foreign Application Priority Data
Mar. 1, 2022    (CN) .......................... 202210195653.4

(51) Int. Cl.
*G06F 13/28* (2006.01)
*G06F 9/54* (2006.01)

(52) U.S. Cl.
CPC .............. *G06F 13/28* (2013.01); *G06F 9/544* (2013.01); *G06F 2209/544* (2013.01)

(58) Field of Classification Search
CPC .... G06F 13/28; G06F 9/544; G06F 2209/544; G06F 9/54; G06F 9/547
See application file for complete search history.

(56) References Cited

U.S. PATENT DOCUMENTS

| 2010/0106948 A1 | 4/2010 | Bellows et al. |
| 2012/0331065 A1* | 12/2012 | Aho ...................... G06F 15/167 |
| | | 709/206 |

(Continued)

FOREIGN PATENT DOCUMENTS

| CN | 103607428 A | 2/2014 |
| CN | 110402568 A | 11/2019 |

(Continued)

OTHER PUBLICATIONS

WO-2019161557-A1, WO-2019161557-A1, Xiao, Lu (Year: 2019).*

(Continued)

*Primary Examiner* — Farley Abad

(57) ABSTRACT

The present specification provides a method and an apparatus for creating a shared remote direct memory access link, which are applied to a local terminal. The method includes: receiving a first creating request for a first shareable remote direct memory access RDMA link initiated by a first application process on the local terminal, where an associated memory address indicated by the first creating request for the first shareable RDMA link is a shared memory address of the first application process and a second application process on the local terminal; creating the first shareable RDMA link between the local terminal and an opposite terminal according to the first creating request, so that the shared memory address is registered to an RDMA device on the local terminal as the associated memory address of the first shareable RDMA link.

20 Claims, 3 Drawing Sheets

(56) References Cited

U.S. PATENT DOCUMENTS

| | | | |
|---|---|---|---|
| 2015/0089009 A1* | 3/2015 | Tsirkin ................... | G06F 12/08 |
| | | | 709/212 |
| 2015/0186331 A1* | 7/2015 | Gao ........................ | H04L 51/04 |
| | | | 709/212 |
| 2016/0203102 A1 | 7/2016 | Meng et al. | |
| 2016/0239430 A1 | 8/2016 | Tsirkin et al. | |
| 2018/0048711 A1 | 2/2018 | Aslam et al. | |
| 2019/0324911 A1* | 10/2019 | Doshi ................ | G06F 12/0842 |

FOREIGN PATENT DOCUMENTS

| | | | |
|---|---|---|---|
| CN | 112422615 A | 2/2021 | |
| CN | 113287286 A | 8/2021 | |
| CN | 113326154 A | 8/2021 | |
| CN | 113535425 A | 10/2021 | |
| CN | 113626184 A | 11/2021 | |
| CN | 114780465 A | 7/2022 | |
| KR | 20190087783 A | 7/2019 | |
| WO | WO2022001417 A1 | 1/2022 | |

OTHER PUBLICATIONS

International Search Report and Written Opinion dated May 18, 2023 for International Application No. PCT/CN2023/075204.

The First Office Action dated Jul. 5, 2023 for Chinese Application No. 202210195653.4.

Notification to Grant Patent Right for Invention dated Jan. 18, 2024 for Chinese Application No. 202210195653.4.

* cited by examiner

METHOD AND APPARATUS FOR CREATING SHAREABLE REMOTE DIRECT MEMORY ACCESS LINK

CROSS-REFERENCE TO RELATED APPLICATIONS

The present application is a national stage of International Application No. PCT/CN2023/075204, filed on Feb. 9, 2023, which claims priority to Chinese Patent Application No. 202210195653.4, entitled "Method and Apparatus for Creating Shareable Remote Direct Memory Access Link" and filed with the China National Intellectual Property Administration on Mar. 1, 2022. Both of the aforementioned applications are hereby incorporated by reference in their entireties.

TECHNICAL FIELD

The present specification relates to the field of communications and, in particular, to a method and an apparatus for creating a shareable remote direct memory access link.

BACKGROUND

As a kind of direct memory access technologies, a remote direct memory access (RDMA) technology enables terminals such as computers to directly access memory data of other terminals without going through processing by processors, thus satisfying requirements of low latency and high efficiency for remote data transmission between multiple terminals.

In the related technologies, a shared memory communications over RDMA (Shared Memory Communications over RDMA, SMC-R) technology is introduced to solve a problem that an RDMA link cannot be shared from one process to other processes. However, this manner will result in that the RDMA link loses a kernel bypass characteristic, thereby reducing data transmission performance.

SUMMARY

In view of this, the present specification provides a method and an apparatus for creating a shareable remote direct memory access link to solve deficiencies in the related technologies.

Specifically, embodiments of the present specification are implemented through the following technical solutions.

According to a first aspect of embodiments of the present specification, a method for creating a shareable remote direct memory access link is provided, the method being applied to a local terminal, and the method including:

receiving a first creating request for a first shareable remote direct memory access RDMA link initiated by a first application process on the local terminal, where an associated memory address indicated by the first creating request for the first shareable RDMA link is a shared memory address of the first application process and a second application process on the local terminal;

creating the first shareable RDMA link between the local terminal and an opposite terminal according to the first creating request, so that the shared memory address is registered to an RDMA device on the local terminal as the associated memory address of the first shareable RDMA link.

According to a second aspect of embodiments of the present specification, an apparatus for creating a shared remote direct memory access link is provided, the apparatus being applied to a local terminal, and the apparatus including:

a creating request receiving unit, configured to receive a first creating request for a first shareable remote direct memory access RDMA link initiated by a first application process on the local terminal, where an associated memory address indicated by the first creating request for the first shareable RDMA link is a shared memory address of the first application process and a second application process on the local terminal;

a link creating unit, configured to create the first shareable RDMA link between the local terminal and an opposite terminal according to the first creating request, so that the shared memory address is registered to an RDMA device on the local terminal as the associated memory address of the first shareable RDMA link.

According to a third aspect of embodiments of the present specification, a computer readable storage medium having a computer program stored thereon is provided. When the computer program is executed by a processor, steps of the method according to the first aspect are implemented.

According to a fourth aspect of embodiments of the present specification, an electronic device is provided, including: a memory, a processor, and a computer program stored on the memory and runnable on the processor. When the processor executes the program, steps of the method according to the first aspect are implemented.

In the technical solutions provided by the present specification, a shared memory address technology is introduced to a local terminal, enabling an RDMA link created by any application process based on the shared memory address to be shared and used by other application processes using the shared memory address. And since the above sharing process for the RDMA link is implemented in a user state, enabling the RDMA link to still utilize a kernel bypass characteristic, sharing of the RDMA link can be achieved, and efficient data transmission performance of the RDMA link can be ensured.

It should be understood that, the above general description and the following detailed description are exemplarily and explanatory, and cannot limit the present specification.

BRIEF DESCRIPTION OF DRAWINGS

In order to explain technical solutions in embodiments of the present specification or in the prior art more clearly, the drawings needed to be used in the description of the embodiments or the prior art will be introduced briefly in the following. Obviously, the drawings in the following description are some embodiments of the present specification. For those skilled in the art, other drawings can be obtained from these drawings without paying creative effort.

DESCRIPTION OF EMBODIMENTS

Figure 1:
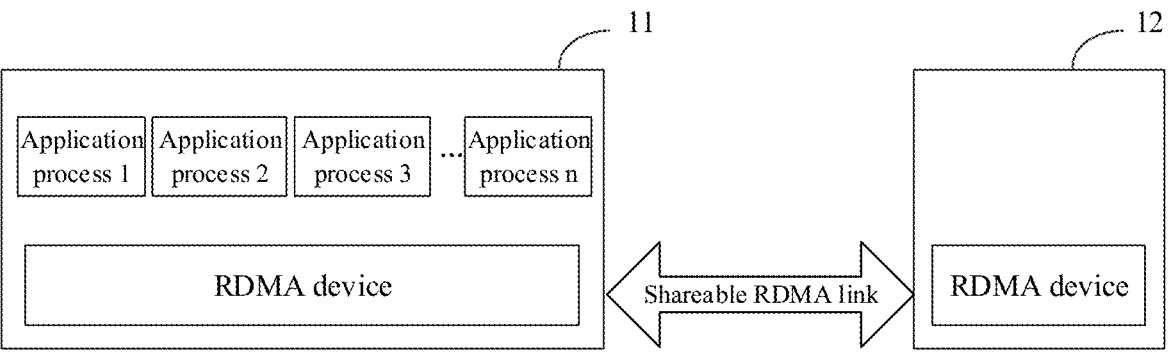
FIG. 1 is a schematic architectural diagram of an interaction system based on an RDMA link according to an exemplary embodiment of the present specification.

The exemplary embodiments will be described in detail here, and examples thereof are shown in the drawings. When the following description refers to the drawings, unless otherwise indicated, the same numbers in different drawings represent the same or similar elements. The implementations described in the following exemplary embodiments do not represent all implementations consistent with the present specification. On the contrary; they are merely examples of apparatuses and methods consistent with some aspects of the present specification as detailed in the appended claims.

The terms used in the present specification are for the purpose of describing particular embodiments only and are not intended to limit the specification. The singular forms "a/an", "said" and "the" used in the present specification and the appended claims are intended to include the plural forms as well, unless the context clearly dictates other meanings. It should also be understood that the term "and/or" used herein refers to and contains any or all possible combinations of one or more of associated listed items.

It should be understood that although the terms first, second, third and the like may be used in the present specification to describe various information, the information should not be limited to these terms. These terms are only used to distinguish information of the same type from each other. For example, without departing from the scope of the present specification, first information may also be called second information, and similarly, the second information may also be called the first information. Depending on the context, the word "if" as used herein may be interpreted as "at the time of" or "when" or "in response to determining".

FIG. 1 is a schematic architectural diagram of an interaction system based on an RDMA link according to an exemplary embodiment of the present specification. As shown in FIG. 1, a local terminal 11 and an opposite terminal 12 may be included.

The local terminal 11 and the opposite terminal 12 refer to electronic devices that support an RDMA technology and that can be used by a user. The local terminal 11 and the opposite terminal 12 need to contain at least one RDMA device that supports the RDMA technology. During an operation process of the system, any application process in the local terminal 11 may create a shareable RDMA link between the local terminal 11 and the opposite terminal 12, and data interaction between the local terminal 11 and the opposite terminal 12 is achieved through the shareable RDMA link. Meanwhile, other application processes in the local terminal 11 may also share and use the shareable RDMA link, so that the above data interaction between the local terminal 11 and the opposite terminal 12 may also be achieved. For example: after application process 1 in the local terminal 11 creates shareable RDMA link A between the local terminal 11 and the opposite terminal 12, application process 2 in the local terminal 11 may also use the shareable RDMA link A to send data to the RDMA device of the opposite terminal 12, or receive data sent by the opposite terminal 12. The user may use the following types of electronic devices as the local terminal 11 and the opposite terminal 12: mobile phones, tablet devices, notebook computers, palmtops (PDAs, Personal Digital Assistants), wearable devices (such as smart glasses, smart watches, etc.), which is not limited in one or more embodiments of the present specification.

It should be noted that "local side" and "opposite side" are a set of relative concepts and are not used to refer to specific electronic devices. For example, when the description is made based on the perspective of the terminal 11, the terminal 11 may be regarded as the local terminal and the terminal 12 may be regarded as the opposite terminal. When the description is made based on the perspective of the terminal 12, the terminal 12 may be regarded as the local terminal and the terminal 11 may be regarded as the opposite terminal. In FIG. 1, the description is made from the perspective of the terminal 11 as an example, so the description is made by adopting the above manner of the local terminal 11 and the opposite terminal 12.

Figure 2:
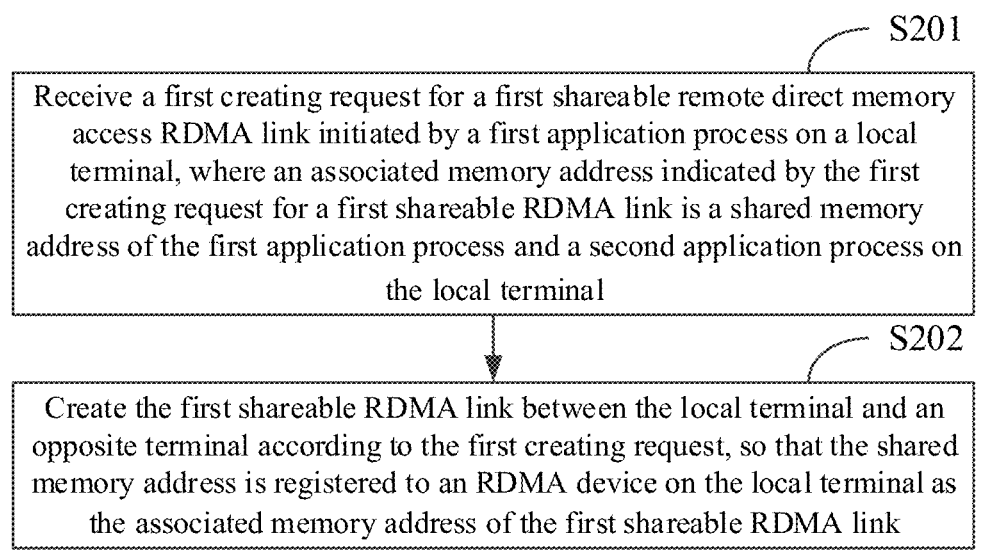
FIG. 2 is a schematic flowchart of a method for creating a shareable RDMA link according to an exemplary embodiment of the present specification.

FIG. 2 is a schematic flowchart of a method for creating a shareable RDMA link according to an exemplary embodiment of the present specification. As shown in FIG. 2, this method is applied to a local terminal and may include the following steps.

S201, receive a first creating request for a first shareable remote direct memory access RDMA link initiated by a first application process on the local terminal, where an associated memory address indicated by the first creating request for the first shareable RDMA link is a shared memory address of the first application process and a second application process on the local terminal.

The first application process and the second application process are two processes running in the local terminal, and the first application process and the second application process may share a same segment of memory address in a memory of the local terminal, that is, the above shared memory address. All or part of data of the first application process and the second application process may be stored in the shared memory address respectively, which is not limited in the present specification.

The first application process and the second application process may be independent from each other, that is, they perform different operations. Or the first application process and the second application process may be parent-child processes, so that they perform same operations. For example, the first application process is a parent process of the second application process, and the second application process is a child process of the first application process; or the second application process is a parent process of the first application process, and the first application process is a child process of the second application process. In short, no matter what relationship exists between the first application process and the second application process, since the associated memory address indicated by the first creating request for the first shareable RDMA link is the above shared memory address, the first application process and the second application process must be able to use the above first shareable RDMA link, so that it is achieved that the first application process shares the RDMA link created by itself to the second application process. When the first application process is the parent process of the second application process and the second application process is the child process of the first application process, the above RDMA link sharing process may be understood as a specific RDMA link inheritance scenario: for the RDMA link created by the first application the process, the second application process inherits the RDMA link from the first application process, so that the second application process can also use the RDMA link.

For the RDMA link established between the local terminal and the opposite terminal, taking the above first shareable RDMA link as an example: the associated memory address of the first shareable RDMA link is a memory address segment in the local terminal, such as the above shared memory address, so that when the local terminal performs the data interaction with the opposite terminal based on the first shareable RDMA link, the interacted data at the local terminal is stored in the shared memory address. As mentioned above, since both the first application process and the second application process can access the shared memory address, the first application process and the second application process can share the above first shareable RDMA link. Then, it is easy to understand that, assuming that a method in the related technologies is still adopted when the first application process creates a certain RDMA link, that is, when the associated memory address of the RDMA link is specified as a certain memory address segment that cannot be accessed by the second application process on the local terminal, the RDMA link cannot be shared by the second application process.

The same memory address segment may be used as associated memory addresses of one or more RDMA links. If it is desired to isolate data transmitted by the RDMA links for considerations such as data security, it may be configured that overlapping is not allowed between the associated memory addresses corresponding to the RDMA links on the local terminal. Assuming that there are two shareable RDMA links established on the local terminal: if there is no above data isolation requirement, associated memory addresses of these two shareable RDMA links may each be set to the entire shared memory address; and if there is the above data isolation requirement, the associated memory addresses of these two shareable RDMA links may be set to separated partial address segments in the above shared memory address respectively, thereby satisfying the sharing requirement and the data isolation requirement for the RDMA links at the same time. In addition to being determined through the above first creating request, the associated memory address may also be a memory address automatically generated by the local terminal through a specific rule or predefined by an administrator, which is not limited in the present specification.

When the first application process needs to establish an RDMA link that may be shared with other terminals, the first application process may initiate a corresponding creating request to the local terminal to create the corresponding RDMA link. For example, as mentioned above, the first application process may trigger the creation of the first shareable RDMA link by initiating the first creating request. Correspondingly, the local terminal may maintain an agent process, and the agent process may be used to monitor the above shared memory address. For example, when the first application process writes the above first creating request in the shared memory address, written data can be detected by the agent process which whereby determines that the first application process needs to establish the shareable RDMA link. For another example, the first application process may perform data communication with the agent process to directly send the first creating request to the agent process, whereby agent process determines that the first application process needs to establish the shareable RDMA link. Of course, the local terminal may also acquire the first creating request initiated by the first application process through any other manner, which is not limited in the present specification.

S202, create the first shareable RDMA link between the local terminal and an opposite terminal according to the first creating request, so that the shared memory address is registered to an RDMA device on the local terminal as the associated memory address of the first shareable RDMA link.

After receiving the first creating request, the local terminal may create the first shareable RDMA link according to the first creating request. The local terminal may create the first shareable RDMA link through any manner of creating the RDMA link in the related technologies, which is not limited in the present specification. As an exemplary embodiment, when the local terminal maintains the agent process mentioned above, the agent process may create the first shareable RDMA link according to the first creating request.

By registering the shared memory address to the RDMA device on the local terminal as the associated memory address of the first shareable RDMA link, the RDMA device can directly perform data reading and writing on the above shared memory address when performing data transmission based on the first shareable RDMA link. The above registration process may be understood as memory registration for the first shareable RDMA link. In the related technologies, the memory registration (MR) is a necessary step in the process of creating the RDMA link. Those skilled in the art may easily understand that the memory registration may be broadly understood as a part of the process of "creating the shareable RDMA link", and only when both "generating the RDMA link" and the "memory registration" are completed, the process of "creating the shareable RDMA link" is considered to be completed; or, "creating the shareable RDMA link" may be narrowly interpreted as "generating the RDMA link", while the "memory registration" is an additional processing step.

In one embodiment, the first creating request may directly include information on the associated memory address, such as a start address and an end address of the corresponding memory address segment, or a start address of the corresponding memory address segment and an offset, etc., which is not limited in the present specification. For example, in a case that the first creating request includes the information on the shared memory address and the information on the shared memory address is marked as the associated memory address of the first shareable RDMA link, the local terminal will create the first shareable RDMA link according to the information on the shared memory address included in the first creating request.

In another embodiment, the first creating request may include information on other existed shareable RDMA link(s), and the local terminal may create the first shareable RDMA link in different ways according to the information included in the first creating request. For example, in a case that the first creating request includes information on a created second shareable RDMA link, the local terminal may acquire context information of the second shareable RDMA link, and create the above first shareable RDMA link according to the context information, where an associated memory address of the second shareable RDMA link recorded in the above context information is the shared memory address. In this embodiment, by reusing the context information of the created second shareable RDMA link, an initialization phase of creating the first shareable RDMA link in the related technologies is simplified, and efficiency of creating the first shareable RDMA link is improved.

Each RDMA link corresponds to one piece of context information, and the context information is description information of the each RDMA link. The above description information includes but is not limited to the associated memory address of the corresponding RDMA link, an event reporting channel for acquiring various event contents sent in the corresponding RDMA link, and completion queues (CQ) information for recording work requests completed by the corresponding RDMA link in a data interaction process. For example, as mentioned above, the local terminal may uniformly store context information of shareable RDMA links in the shared memory address, so that the above first application process can view the context information of the existing shareable RDMA links in the shared memory, and then select the second shareable RDMA link such as the one mentioned above and reuse the context information of the second shareable RDMA link when creating the first shareable RDMA link.

When multiple shareable RDMA links are created between the local terminal and the opposite terminal, and context information of the above multiple shareable RDMA links is maintained on the local terminal, the context information including associated memory addresses of corresponding shareable RDMA links, the local terminal may determine a shareable RDMA link from the above multiple shareable RDMA links for any application process in the terminal.

In one embodiment, the local terminal receives a data transmission request for the opposite terminal initiated by any application process, where the any application process corresponds to the shared memory address. If the any application process has indicated a to-be-used shareable RDMA link in the above data transmission request, it is determined to respond to the above data transmission request by the shareable RDMA link.

In another embodiment, the local terminal receives a data transmission request for the opposite terminal initiated by any application process, where the any application process corresponds to the shared memory address. If the any application process does not indicate a to-be-used shareable RDMA link in the above data transmission request, shared RDMA link(s) whose associated memory address(es) is (are) the above shared memory address among the above multiple shareable RDMA links can be determined according to the above context information, and a target shareable RDMA link is selected from the determined shareable RDMA link(s) to respond to the above data transmission request. The local terminal may dynamically select the above target shareable RDMA link according to a preset selection rule or according to constants, for example, a maximum data transmission size, an average transmission load and/or the like of the link(s) in the above determined shareable RDMA link(s), which is not limited in the present specification.

Before the local terminal formally performs data interaction with the opposite terminal based on the first shareable RDMA link, the local terminal may notify that the associated memory address of the first shareable RDMA link in the local terminal is the shared memory address, so that the opposite terminal can target to perform legal data interaction for the shared memory address.

In one embodiment, the local terminal sends the shared memory address to the opposite terminal through the RDMA device, so that data interaction is implemented between a memory address associated with the first shareable RDMA link in the opposite terminal and the shared memory address based on the first shareable RDMA link.

When the shareable RDMA link is established between the local terminal and the opposite terminal and the data interaction is formally carried out, the local terminal may determine a memory address in the local terminal for receiving data sent by the opposite terminal, according to a writing operation request initiated by the opposite terminal.

In one embodiment, the local terminal may receive, through any shareable RDMA link, a writing operation request for the local terminal initiated by any application process on the opposite terminal, where the associated memory address of the above any shareable RDMA link is the shared memory address. In a case that the above writing operation request includes a target address segment, data sent by the opposite terminal is written into the target address segment, where the target address segment is a partial memory address segment obtained by dividing the shared memory address. For example: there is shareable RDMA link A between the local terminal and the opposite terminal, and there is a shared memory address [0, 100] in the local terminal which is an associated memory address of the shareable RDMA link A. When the writing operation request received by the local terminal from the opposite terminal through the shareable RDMA link A describes a target address segment [50, 60], the local terminal may write the data sent by the opposite terminal into the target address segment [50, 60].

In another embodiment, when the writing operation request does not include the memory address for writing data, the data sent by the opposite terminal may be written into the shared memory address. Even if the opposite terminal does not specify the memory address for writing data, the local terminal may determine the memory address for writing data according to a preset memory address determination rule. For example: there is a shared memory address [0, 100] which is an associated memory address of shareable RDMA link B between the local terminal and the opposite terminal. When the writing operation request received by the local terminal from the opposite terminal through the shareable RDMA link B does not include the memory address for writing data, the local terminal may write the data sent by the opposite terminal to the target address segment, and the memory address in the shared memory address for writing data is determined in accordance with an order of memory address from low to high, the last writing time from recent to far, etc.

When the above writing of the data fails due to problems such as the shared memory being too small, a free address segment in the target address segment being too small, etc., the local terminal may try to solve the above problems by extending the shared memory address and associated memory address, optimizing the data type of the written data, etc., which is not limited in the present specification.

It can be known from the above embodiments, in the method for creating the shareable remote direct memory access link in the present specification, the technical mean of shared memory address is introduced, enabling the RDMA link created by any application process on the shared memory address to be shared and used by other application processes located at the same shared memory address. And since the above process is implemented in a user state, the shareable RDMA link in the present specification achieves the kernel bypass characteristic compared to the SMC-R technology achieved based on a kernel state, which improves data transmission performance. Meanwhile, the present specification provides the solution for determining the target shareable RDMA link from multiple shareable RDMA links, which simplifies additional user operations in the related technologies. In addition, by sending the shared memory address of the local terminal to the opposite terminal, normal execution of the local terminal and the opposite terminal is ensured.

Figure 3:
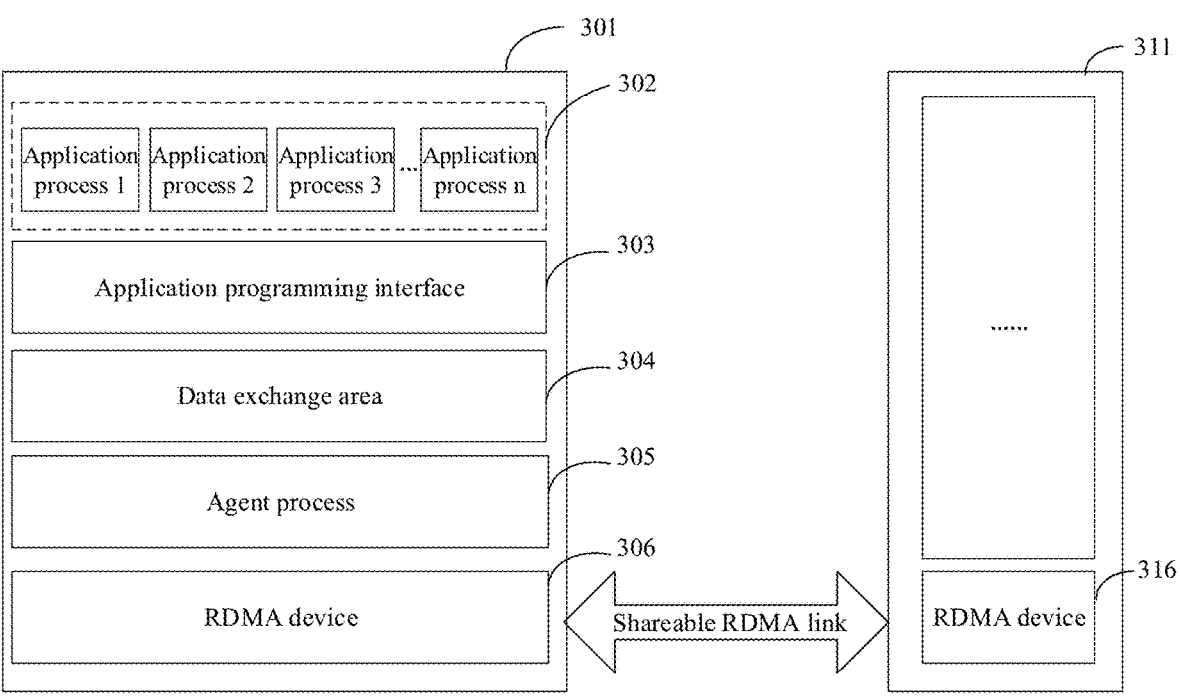
FIG. 3 is a schematic diagram of a composition and application solution of a shareable RDMA link system according to an exemplary embodiment of the present specification.

FIG. 3 is a schematic diagram of a composition and application solution of a shareable RDMA link system according to an exemplary embodiment of the present specification. As shown in FIG. 3, the shareable RDMA link system may include the following modules.

A local terminal 301 and an opposite terminal 311 are two independent electronic devices that support an RDMA technology.

An application process group 302 includes one or more application processes. Any application process in the application process group 302 may read and write data in a data exchange area 304 through an application programming interface 303, which achieves an effect of indirectly using a shareable RDMA link for communication.

The application programming interface (API) 303 includes one or more interfaces, which may be used to achieve reading and writing of the data in the data exchange area 304 by any application process in the application process group 302.

The data exchange area 304 is formed by a shared memory, and stores data of all application processes in the application process group 302 and of an agent process 305. As a medium for direct communication between any application process in the application process group 302 and the agent process 305, any application process described above is enabled to use the shareable RDMA link for communication without directly accessing an RDMA device.

The agent process 305 is a process responsible for data communication with an RDMA device 306, that is, responsible for collecting data on the RDMA device 306 onto the data exchange area 304 and sending data on the data exchange area 304 to an RDMA device 316 through the RDMA device 306. At the same time, the agent process 305 may monitor and respond to a creating request initiated in the data exchange area 304 by any application process in the application programming interface 303.

The RDMA devices 306 and 316 may be RDMA-supported network cards or driving devices or others provided in the local terminal 301 and the opposite terminal 311 respectively.

Based on the above composition structure of the shared RDMA link system, the following operations such as creating and sharing of a shareable RDMA link may be implemented.

As an example, application process 1 in the application process group 302 creates shareable RDMA link A. The application process 1 is a parent process of application process 2, and the application process 2 is a child process of the application process 1. When the application process 1 needs to create the shareable RDMA link A, description information which includes at least an unique identification of the application process 1 and an indication that an associated memory address of the shareable RDMA link A is the data exchange area 304 may be written into the data exchange area 304 through the corresponding application programming interface 303 as data of a creating request describing that the application process 1 needs to create the RDMA link A. At the same time, the agent process 305 detects the above data of the creating request written in the data exchange area 304, and determines that the application process 1 needs to create the above shareable RDMA link A based on the data of the creating request. When determining that the application process 1 needs to create the above shareable RDMA link A, the agent process 305 registers the shared memory address 304 to the RDMA device 306 as the associated memory address of the shareable RDMA link A according to the above data of the creating request. After receiving a first-time connection request for the shareable RDMA link A from the opposite terminal 311, the agent process 305 may write information such as a device identification of the opposite terminal 311 and an associated memory address about the shareable RDMA link A in the opposite terminal 311 into context information of the shareable RDMA link A, so that the shareable RDMA link A is a shareable RDMA link through which the local terminal 301 and the opposite terminal 311 can perform formal data interaction.

Since the associated memory address of the shareable RDMA link A is the data exchange area 304, and all application processes in the application process group 302 are stored in the data exchange area 304, in addition to the application process 1, other application processes in the data exchange area 304 can also use the shareable RDMA link A to achieve data interaction between the local terminal 301 and the opposite terminal 311.

As an example, application process 2 uses the above shareable RDMA link A to write data to the opposite terminal 311. By means of using the application programming interface 303 to read and write relevant data in the data exchange area 304, the application process 2 notifies the agent process 305 which monitors the data exchange area 304 to send a data writing request including a string "abc" from the RDMA device 306 to the RDMA device 316 of the opposite terminal 311 through the shareable RDMA link A. When the opposite RDMA device 316 receives the above data writing request, the data corresponding to the string may be directly written to the memory address associated with the shareable RDMA link A in the opposite side 316 according to the context information of the shareable RDMA link A.

As an example, an application process of the opposite terminal 311 may write data to the local terminal 301 through the shareable RDMA link A. The opposite terminal 311 may send a first writing request for representing that the opposite terminal 311 will write data to the local terminal 301. After the RDMA device 306 in the local terminal 301 receives the first writing request, the agent process 305 may indicate to the RDMA device 306 according to the first writing request to send the associated memory address [1, 100] about the shareable RDMA link A in the data exchange area 304 to the opposite terminal 311 through the shareable RDMA link A, so that the opposite terminal 311 may send a second writing request including at least writing data of a string "ABC" and a writing address [50, 60] to the local terminal 301 through the shareable RDMA link A again. When the RDMA device 306 in the local terminal 301 receives the second writing request, the RDMA device 306 may specifically write the writing data including the string "ABC" into the address [50, 60] of the data exchange area 304 according to the second writing request.

Figure 4:
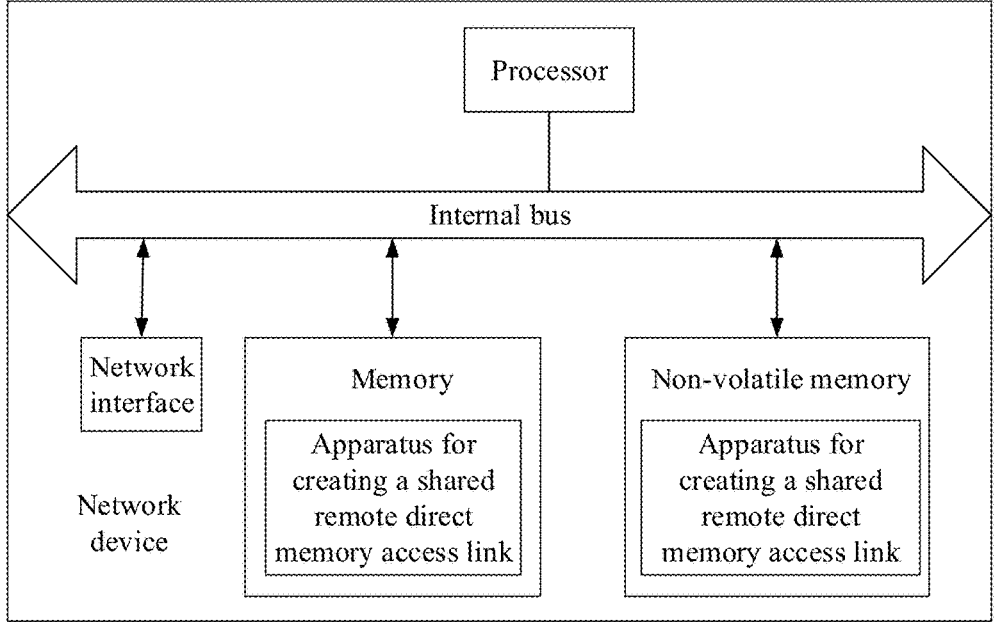
FIG. 4 is a schematic structural diagram of an electronic device according to an exemplary embodiment of the present specification.

FIG. 4 is a schematic structural diagram of an electronic device in an exemplary embodiment. Please refer to FIG. 4, at a hardware level, the electronic device includes a processor, an internal bus, a network interface, a memory and a non-volatile memory, and of course may also include other required hardware. The processor reads a corresponding computer program from the non-volatile memory into the memory and then runs it, forming an apparatus for creating a shareable remote direct memory access link at a logical level. Of course, in addition to a software implementation, the present specification does not exclude other implementations, such as implementations with logic devices or a combination of software and hardware, etc. That is to say, execution entities of the following processing flows are not limited to respective logical units, and may also be hardware or logic devices.

Corresponding to the foregoing embodiments of the method for creating the shareable remote direct memory access link, the present specification also provides embodiments of an apparatus for creating a shareable remote direct memory access link.

Figure 5:
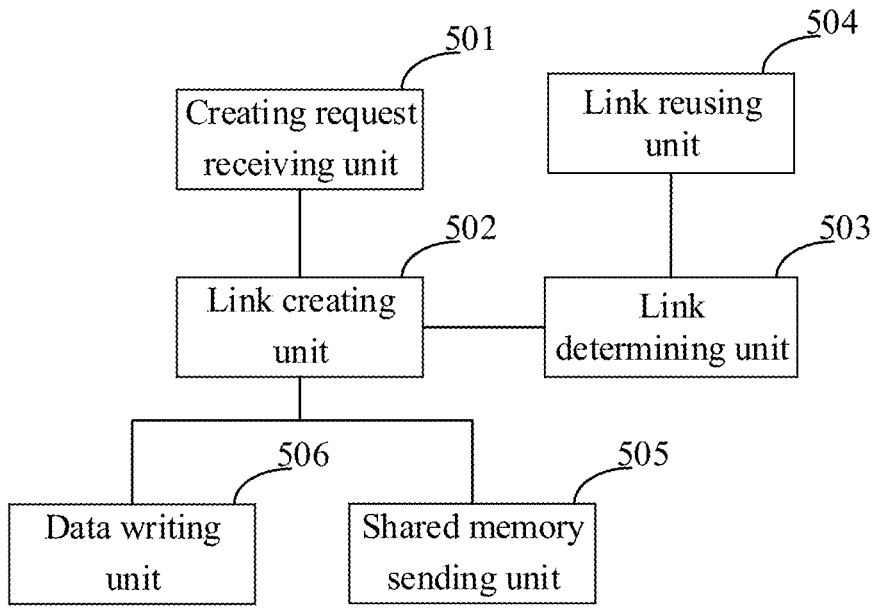
FIG. 5 is a schematic structural diagram of an apparatus of creating a shareable RDMA link according to an exemplary embodiment of the present specification.

Please refer to FIG. 5, which is a schematic structural diagram of an apparatus for creating a shareable remote direct memory access link according to an exemplary embodiment. As shown in FIG. 5, in a software implementation, the apparatus for creating the shareable remote direct memory access link is applied to a local terminal, and the apparatus may include:

a creating request receiving unit 501, configured to receive a first creating request for a first shareable remote direct memory access RDMA link initiated by a first application process on the local terminal, where an associated memory address indicated by the first creating request for the first shareable RDMA link is a shared memory address of the first application process and a second application process on the local terminal;

a link creating unit 502, configured to create the first shareable RDMA link between the local terminal and an opposite terminal according to the first creating request, so that the shared memory address is registered to an RDMA device on the local terminal as the associated memory address of the first shareable RDMA link.

In an embodiment, the link creating unit 502 is specifically configured to:

in a case that the first creating request includes information on the shared memory address and the information on the shared memory address is marked as the associated memory address of the first shareable RDMA link, create the first shareable RDMA link according to the information on the shared memory address included in the first creating request; or, in a case that the first creating request includes information on a created second shareable RDMA link, acquire context information of the second shareable RDMA link, and create the first shareable RDMA link according to the context information; where an associated memory address of the second shareable RDMA link recorded in the context information is the shared memory address.

In an embodiment, multiple shareable RDMA links are created between the local terminal and the opposite terminal, and context information of the multiple shareable RDMA links is maintained on the local terminal, where the context information includes associated memory addresses of corresponding shareable RDMA links; the apparatus further includes:

a link determining unit 503, configured to:

receive a data transmission request for the opposite terminal initiated by any application process, where the any application process corresponds to the shared memory address;

if the any application process does not indicate a to-be-used shareable RDMA link in the data transmission request, determine, according to the context information, a shared RDMA link whose associated memory address is the shareable memory address among the multiple shareable RDMA links, and select a target shareable RDMA link from the determined shareable RDMA link to respond to the data transmission request.

In an embodiment, the apparatus further includes:

a link reusing unit 504, configured to: if the any application process indicates the to-be-used shareable RDMA link in the data transmission request, respond to the data transmission request through the to-be-used shareable RDMA link.

In an embodiment, the apparatus further includes:

a shared memory sending unit 505, configured to send the shared memory address to the opposite terminal through the RDMA device, so that data interaction is implemented between a memory address associated with the first shareable RDMA link in the opposite terminal and the shared memory address based on the first shareable RDMA link.

In an embodiment, the apparatus further includes:

a data writing unit 506, configured to:

receive, through any shareable RDMA link, a writing operation request for the local terminal initiated by any application process on the opposite terminal, where an associated memory address of the any shareable RDMA link is the shared memory address;

in a case that the writing operation request includes a target address segment, write data sent by the opposite terminal into the target address segment, where the target address segment is a partial memory address segment obtained by dividing the shared memory address;

in a case that the writing operation request does not include a memory address for writing data, write the data sent by the opposite terminal into the shared memory address.

In an embodiment, the first application process and the second application process are independent from each other, or are parent-child processes.

In an embodiment, an agent process runs on the local terminal, and the agent process is used to implement at least one of the following:

performing monitoring on and responding to the first creating request;

performing data interaction between the RDMA device and the shared memory address.

In an embodiment, an application programming interface API for the shared memory address is created on the local terminal; where the API is used to be provided to an application process corresponding to the shared memory address to access the shared memory address by the application process.

The details of the implementation process of the functions and effects of the units in the above apparatus may be found in the implementation process of the corresponding steps in the above method, which will not be repeated here.

As for the apparatus embodiments, since they basically correspond to the method embodiments, the relevant content may be found in the part of the description of the method embodiments. The apparatus embodiments described above are only illustrative. The units described as separate components may or may not be physically separated, and the components displayed as units may or may not be physical units, that is, they may be located in one place, or may be distributed to multiple network units. Some or all of the units may be selected according to actual needs to achieve the purposes of the solutions of the present specification. Those skilled in the art can understand and implement them without paying creative effort.

Embodiments of the subject matters and functional operations described in the present specification may be implemented in the following: a digital electronic circuit, computer software or firmware embodied tangibly, computer hardware including the structures disclosed in the present specification and their structural equivalents, or combinations of one or more of them. Embodiments of the subject matters described in the present specification may be implemented as one or more computer programs, i.e., one or more modules of computer program instructions encoded on a tangible non-transitory program carrier for execution by a data processing apparatus or for controlling operations of the data processing apparatus. Alternatively or additionally, the program instructions may be encoded on propagated signals that are artificially generated, such as electrical, optical or electromagnetic signals generated by a machine, and the signals are generated to encode and transmit information to a suitable receiver apparatus for execution by the data processing apparatus. A computer storage medium may be a machine readable storage device, a machine readable storage substrate, a random or serial access memory device, or combinations of one or more of them.

The processing and logic flows described in the present specification may be executed by one or more programmable computers executing one or more computer programs, so as to execute corresponding functions by operating according to input data and generating output. The processing and logic flows may also be executed by a special-purpose logic circuit, such as an FPGA (Field Programmable Gate Array) or an ASIC (Application Specific Integrated Circuit), and the apparatus may also be implemented as the special-purpose logic circuit.

A computer suitable for executing computer programs includes, for example, a general-purpose and/or special-purpose microprocessor, or any other type of central processing unit. Usually, the central processing unit will receive instructions and data from a read-only memory and/or a random access memory. The basic components of the computer include the central processing unit for implementing or executing instructions and one or more memory devices for storing instructions and data. Usually, the computer will also include one or more mass storage devices for storing data, such as a magnetic disk, a magneto-optical disk, an optical disk or the like, or the computer will be operably coupled to such mass storage devices to receive data therefrom or transmit data to them or both. However, the computer is not required to have such devices. In addition, the computer may be embedded in another device, for example, a mobile phone, a personal digital assistant (PDA), a mobile audio or video player, a game console, a global positioning system (GPS) receiver, or a portable storage device such as a universal serial bus (USB) flash drive, to name a few.

A computer readable medium suitable for storing computer program instructions and data includes all forms of non-volatile memories, media and memory devices, for example, includes a semiconductor memory device (for example, an EPROM, an EEPROM, and a flash memory device), a magnetic disk (for example, an internal hard disk or a removable disk), a magneto-optical disk, a CD ROM and a DVD-ROM disk. The processor and the memory may be supplemented by or incorporated into the special-purpose logic circuit.

Although the present specification includes many specific implementation details, these should not be interpreted as limiting the scope of any invention or the scope what is claimed, but are primarily used to describe features of specific embodiments of particular inventions. Certain features described in multiple embodiments in the present specification may also be combined for implementation in a single embodiment. On the other hand, various features described in a single embodiment may also be separately implemented in multiple embodiments or be implemented in any suitable sub-combinations. Furthermore, although features may function in certain combinations as described above and may even be originally claimed as such, one or more features from a claimed combination may be removed from this combination in some situations, and the claimed combination may point to the sub-combinations or variations of the sub-combination.

Similarly, although operations are described in a specific order in the drawings, this should not be understood as requiring these operations to be performed in the specific order as shown or in sequence, or requiring all illustrated operations to be executed, to achieve a desired result. In some situations, multitasking and parallel processing may be advantageous. In addition, a separation of various system modules and components in the above embodiments should not be understood as requiring such separation in all embodiments, and it should be understood that the described program components and systems may generally be integrated together in a single software product, or packaged into multiple software products.

Thus, specific embodiments of the subject matters have been described. Other embodiments are within the scope of the appended claims. In some situations, the actions recited in the claims may be executed in a different order to still achieve the desired result. Furthermore, the processing described in the drawings does not necessarily be executed in the specific order as shown or in sequence, to achieve the desired result. In some implementations, multitasking and parallel processing may be advantageous.

The above are only preferred embodiments of the present specification and are not intended to limit the present specification. Any modifications, equivalent replacements, improvements and the like made within the spirit and principle of the present specification shall be included in the protection scope of the present specification.

The invention claimed is:

1. A method for creating a shareable remote direct memory access link, the method being applied to a local terminal, and the method comprising:
   receiving a first creating request for a first shareable remote direct memory access RDMA link initiated by a first application process on the local terminal, wherein an associated memory address indicated by the first creating request for the first shareable RDMA link is a shared memory address of the first application process and a second application process on the local terminal;
   creating the first shareable RDMA link between the local terminal and an opposite terminal according to the first creating request, so that the shared memory address is registered to an RDMA device on the local terminal as the associated memory address of the first shareable RDMA link.

2. The method according to claim 1, wherein the creating the first shareable RDMA link between the local terminal and the opposite terminal according to the first creating request comprises:
   in a case that the first creating request comprises information on the shared memory address and the information on the shared memory address is marked as the associated memory address of the first shareable RDMA link, creating the first shareable RDMA link according to the information on the shared memory address comprised in the first creating request; or,
   in a case that the first creating request comprises information on a created second shareable RDMA link, acquiring context information of the second shareable RDMA link, and creating the first shareable RDMA link according to the context information; wherein an associated memory address of the second shareable RDMA link recorded in the context information is the shared memory address.

3. The method according to claim 1, wherein multiple shareable RDMA links are created between the local terminal and the opposite terminal, and context information of the multiple shareable RDMA links is maintained on the local terminal, wherein the context information comprises associated memory addresses of corresponding shareable RDMA links; the method further comprises:

receiving a data transmission request for the opposite terminal initiated by any application process, wherein the any application process corresponds to the shared memory address;

if the any application process does not indicate a to-be-used shareable RDMA link in the data transmission request, determining, according to the context information, a shared RDMA link whose associated memory address is the shareable memory address among the multiple shareable RDMA links, and selecting a target shareable RDMA link from the determined shareable RDMA link to respond to the data transmission request.

4. The method according to claim 3, further comprising:

if the any application process indicates the to-be-used shareable RDMA link in the data transmission request, responding to the data transmission request through the to-be-used shareable RDMA link.

5. The method according to claim 1, further comprising:

sending the shared memory address to the opposite terminal through the RDMA device, so that data interaction is implemented between a memory address associated with the first shareable RDMA link in the opposite terminal and the shared memory address based on the first shareable RDMA link.

6. The method according to claim 1, further comprising:

receiving, through any shareable RDMA link, a writing operation request for the local terminal initiated by any application process on the opposite terminal, wherein an associated memory address of the any shareable RDMA link is the shared memory address;

in a case that the writing operation request comprises a target address segment, writing data sent by the opposite terminal into the target address segment, wherein the target address segment is a partial memory address segment obtained by dividing the shared memory address;

in a case that the writing operation request does not comprise a memory address for writing data, writing the data sent by the opposite terminal into the shared memory address.

7. The method according to claim 1, wherein the first application process and the second application process are independent from each other, or are parent-child processes.

8. The method according to claim 1, wherein an agent process runs on the local terminal, and the agent process is used to implement at least one of the following:

performing monitoring on and responding to the first creating request;

performing data interaction between the RDMA device and the shared memory address.

9. The method according to claim 1, wherein an application programming interface API for the shared memory address is created on the local terminal; wherein the API is used to be provided to an application process corresponding to the shared memory address to access the shared memory address by the application process.

10. An apparatus for creating a shared remote direct memory access link, the apparatus being applied to a local terminal, and the apparatus comprising: a memory, a processor, and a computer program stored on the memory and runnable on the processor, wherein when the computer program is executed by the processor, the processor is configured to:

receive a first creating request for a first shareable remote direct memory access RDMA link initiated by a first application process on the local terminal, wherein an associated memory address indicated by the first creating request for the first shareable RDMA link is a shared memory address of the first application process and a second application process on the local terminal;

create, the first shareable RDMA link between the local terminal and an opposite terminal according to the first creating request, so that the shared memory address is registered to an RDMA device on the local terminal as the associated memory address of the first shareable RDMA link.

11. The apparatus according to claim 10, wherein the processor is configured to:

in a case that the first creating request comprises information on the shared memory address and the information on the shared memory address is marked as the associated memory address of the first shareable RDMA link, create the first shareable RDMA link according to the information on the shared memory address comprised in the first creating request; or, in a case that the first creating request comprises information on a created second shareable RDMA link, acquire context information of the second shareable RDMA link, and create the first shareable RDMA link according to the context information; wherein an associated memory address of the second shareable RDMA link recorded in the context information is the shared memory address.

12. The apparatus according to claim 10, wherein multiple shareable RDMA links are created between the local terminal and the opposite terminal, and context information of the multiple shareable RDMA links is maintained on the local terminal, wherein the context information comprises associated memory addresses of corresponding shareable RDMA links; the processor is further configured to:

receive a data transmission request for the opposite terminal initiated by any application process, wherein the any application process corresponds to the shared memory address;

if the any application process does not indicate a to-be-used shareable RDMA link in the data transmission request, determine, according to the context information, a shared RDMA link whose associated memory address is the shareable memory address among the multiple shareable RDMA links, and select a target shareable RDMA link from the determined shareable RDMA link to respond to the data transmission request.

13. The apparatus according to claim 12, wherein the processor is further configured to:

if the any application process indicates the to-be-used shareable RDMA link in the data transmission request, respond to the data transmission request through the to-be-used shareable RDMA link.

14. The apparatus according to claim 10, wherein the processor is further configured to:

send the shared memory address to the opposite terminal through the RDMA device, so that data interaction is implemented between a memory address associated with the first shareable RDMA link in the opposite terminal and the shared memory address based on the first shareable RDMA link.

15. The apparatus according to claim 10, wherein the processor is further configured to:

receive, through any shareable RDMA link, a writing operation request for the local terminal initiated by any application process on the opposite terminal, wherein an associated memory address of the any shareable RDMA link is the shared memory address;

in a case that the writing operation request comprises a target address segment, write data sent by the opposite terminal into the target address segment, wherein the target address segment is a partial memory address segment obtained by dividing the shared memory address;

in a case that the writing operation request does not comprise a memory address for writing data, write the data sent by the opposite terminal into the shared memory address.

16. The apparatus according to claim 10, wherein the first application process and the second application process are independent from each other, or are parent-child processes.

17. The apparatus according to claim 10, wherein an agent process runs on the local terminal, and the agent process is used to implement at least one of the following:

performing monitoring on and responding to the first creating request;

performing data interaction between the RDMA device and the shared memory address.

18. The apparatus according to claim 10, wherein an application programming interface API for the shared memory address is created on the local terminal;

wherein the API is used to be provided to an application process corresponding to the shared memory address to access the shared memory address by the application process.

19. A non-transitory computer readable storage medium, having a computer program stored thereon, wherein when the computer program is executed by a processor, the following steps are implemented:

receiving a first creating request for a first shareable remote direct memory access RDMA link initiated by a first application process on the local terminal, wherein an associated memory address indicated by the first creating request for the first shareable RDMA link is a shared memory address of the first application process and a second application process on the local terminal;

creating the first shareable RDMA link between the local terminal and an opposite terminal according to the first creating request, so that the shared memory address is registered to an RDMA device on the local terminal as the associated memory address of the first shareable RDMA link.

20. The non-transitory computer readable storage medium according to claim 19, wherein when the computer program is executed by the processor, the following steps are implemented:

in a case that the first creating request comprises information on a created second shareable RDMA link, acquiring context information of the second shareable RDMA link, and creating the first shareable RDMA link according to the context information; wherein an associated memory address of the second shareable RDMA link recorded in the context information is the shared memory address.

* * * * *